(12) United States Patent
Chung et al.

(10) Patent No.: US 10,379,886 B2
(45) Date of Patent: Aug. 13, 2019

(54) METHOD AND SYSTEM FOR ENHANCING LOADING SPEED OF INTERMEDIATE LANGUAGE FILE

(71) Applicant: LINE Corporation, Shibuya-ku, Tokyo (JP)

(72) Inventors: Sang Min Chung, Seongnam-si (KR); SangHun Jeon, Seongnam-si (KR); Myungju Chung, Seongnam-si (KR); Wang Jin Oh, Seongnam-si (KR); Sungbeom Ahn, Seongnam-si (KR); Dongpil Seo, Seongnam-si (KR); Kwang-Hee Han, Seongnam-si (KR); Tae Woo Kim, Seongnam-si (KR); Seong Yeol Lim, Seongnam-si (KR); Joo Hyeon Ryu, Seongnam-si (KR)

(73) Assignee: LINE CORPORATION, Tokyo (JP)

( * ) Notice: Subject to any disclaimer, the term of this patent is extended or adjusted under 35 U.S.C. 154(b) by 0 days.

(21) Appl. No.: 15/434,217

(22) Filed: Feb. 16, 2017

(65) Prior Publication Data

US 2017/0242716 A1 Aug. 24, 2017

(30) Foreign Application Priority Data

Feb. 18, 2016 (KR) .................. 10-2016-0019007

(51) Int. Cl.
*G06F 9/44* (2018.01)
*G06F 9/455* (2018.01)
(Continued)

(52) U.S. Cl.
CPC .......... *G06F 9/45525* (2013.01); *G06F 21/51* (2013.01); *G06F 2221/033* (2013.01); *H03M 13/09* (2013.01)

(58) Field of Classification Search
None
See application file for complete search history.

(56) References Cited

U.S. PATENT DOCUMENTS

| 2002/0046400 A1* | 4/2002 | Burch ....................... G06F 8/48 717/154 |
| 2013/0061222 A1* | 3/2013 | Hwang ............... G06F 9/45516 718/1 |

(Continued)

FOREIGN PATENT DOCUMENTS

| KR | 20070067953 A | 6/2007 |
| KR | 20130027158 A | 3/2013 |
| KR | 20130093775 A | 8/2013 |

OTHER PUBLICATIONS

Korean Office Action dated Mar. 20, 2017.

*Primary Examiner* — Insun Kang
(74) *Attorney, Agent, or Firm* — Harness, Dickey & Pierce, P.L.C.

(57) ABSTRACT

A non-transitory computer-readable medium stores computer-executable instructions that, when executed by a computer, cause the computer to perform operations including generating a changed optimization file by changing an original optimization file, the original optimization file being an optimization file created at a point in time at which an intermediate language file for an application is loaded; storing the changed optimization file; creating and storing verification information for verifying whether the intermediate language file is changed; determining whether the intermediate language file is changed based on the stored verification information in response to reloading of the intermediate language file; and creating a new optimization file by deleting the changed optimization file or recovering the original optimization file based on the changed optimi- (Continued)

zation file and reusing the original optimization file, based on whether the intermediate language file is changed.

16 Claims, 7 Drawing Sheets

(51) Int. Cl.
  *G06F 21/51* (2013.01)
  *H03M 13/09* (2006.01)

(56) References Cited

U.S. PATENT DOCUMENTS

| | | | |
|---|---|---|---|
| 2017/0115973 A1* | 4/2017 | Lee | G06F 8/48 |
| 2017/0161325 A1* | 6/2017 | Rastogi | G06F 17/30463 |
| 2017/0220335 A1* | 8/2017 | Pink | G06F 8/68 |
| 2017/0262656 A1* | 9/2017 | Salmon-Legagneur | G06F 21/64 |
| 2017/0270319 A1* | 9/2017 | Salmon-Legagneur | G06F 21/64 |

* cited by examiner

METHOD AND SYSTEM FOR ENHANCING LOADING SPEED OF INTERMEDIATE LANGUAGE FILE

CROSS-REFERENCE TO RELATED APPLICATION(S)

This application claims priority under 35 U.S.C. § 119 to Korean Patent Application No. 10-2016-0019007 filed on Feb. 18, 2016, in the Korean Intellectual Property Office (KIPO, the entire contents of which are incorporated herein by reference.

BACKGROUND

Field

One or more example embodiments relate to a method and system for enhancing a loading speed of an intermediate language file.

Description of Related Art

An intermediate language or InterLanguage (IL) may indicate a language used as an intermediate stage when translating a source language program with a complier and making the source language program into a target language program. For example, if a high level language program is made into a machine language program by converting the high level language program to an assembly language and by assembling the converted assembly language to generate the machine language, the assembly language is an example of an intermediate language.

At least some related art relates to an apparatus and method for converting an intermediate language of a mobile platform, and discloses a C/C++ compiler configured to convert a mobile platform source code developed with C or C++ language to an intermediate language code required at an interpreter of a mobile communication terminal and an intermediate language assembler configured to convert the intermediate language code to a format executed at the interpreter of the mobile communication terminal.

A code of an application that goes through conversion to the intermediate language may be vulnerable to decompiling due to a characteristic of the code. For example, a code of an application created with a programming language such as JAVA goes through conversion to the intermediate language due to its characteristic and is vulnerable to decompiling. Thus, an important code may be easily exposed and manipulated. In detail, a code created with JAVA is generally compiled to a file with extension ".class" for each class and, in ANDROID, codes created with JAVA are compiled based on a dex file that includes a header and data, for example, 'classes.dex'. Here, the dex file is a bytecode that is a binary code as an intermediate language code in which a JAVA code is compiled. The bytecode is a compiled form of a JAVA program. Once the JAVA program is converted to the bytecode, the bytecode may be transmitted over a network and may be executed at a virtual machine.

For example, files compiled in a form of an intermediate language code may be provided from a server to an electronic device. The electronic device may execute the files compiled in the form of the intermediate language code using a supported virtual machine. Accordingly, the electronic device may acquire and correct an original code by decompiling the compiled files based on a characteristic of the intermediate language and may compile the corrected code to a form of the intermediate language code again. In this aspect, an application may be forged.

To address the above issue, in the related art, an obfuscation technique, an encryption technique, etc., may be applied to an intermediate language file, such as a dex file, in order to protect the intermediate language file.

Meanwhile, a virtual machine is configured to create an optimization file associated with an intermediate language file based on a type of the virtual machine, and to load and process the optimization file. For example, a virtual machine of an ART mode of ANDROID translates all of intermediate languages included in an application in response to installation of the application, creates the optimization file, for example, an odex file or an oat file, in advance, and executes the application using the optimization file.

However, due to the forgery issue of the application, a system that executes the application may not continuously use the created optimization file. For example, due to a code protection and the like, the system needs to delete the optimization file, to decrypt an obfuscated or encrypted file associated with an intermediate language file every time an application is executed, and to create a new optimization file every time the application is executed. In this case, a relatively large amount of time is used to create and load the optimization file.

SUMMARY

One or more example embodiments provide a method and system that may enhance a loading speed of an intermediate language file by simultaneously protecting and reusing an optimization file associated with the intermediate language file, for example, a dex file of ANDROID.

According to at least some example embodiments, a non-transitory computer-readable medium stores computer-executable instructions that, when executed by a computer, cause the computer to perform operations including generating a changed optimization file by changing an original optimization file, the original optimization file being an optimization file created at a point in time at which an intermediate language file for an application is loaded; storing the changed optimization file; creating and storing verification information for verifying whether the intermediate language file is changed; determining whether the intermediate language file is changed based on the stored verification information in response to reloading of the intermediate language file; and creating a new optimization file by deleting the changed optimization file or recovering the original optimization file based on the changed optimization file and reusing the original optimization file, based on whether the intermediate language file is changed.

According to at least some example embodiments, a loading speed enhancement method executed at a computer includes generating a changed optimization file by changing an original optimization file, the original optimization file being an optimization file created at a point in time at which an intermediate language file for an application is loaded; storing the changed optimization file; creating and storing verification information for determining whether the intermediate language file is changed; determining whether the intermediate language file is changed based on the stored verification information in response to reloading of the intermediate language file; and creating a new optimization file by deleting the changed optimization file or recovering the original optimization file based on the changed optimization file and reusing the original optimization file, based on whether the intermediate language file is changed.

According to at least some example embodiments, a loading speed enhancement system includes memory storing computer-executable instructions; one or more processors configured to execute computer-readable instructions such that the one or more processors are configured to, generate a changed optimization file by changing an original optimization file, the original optimization file being an optimization file created at a point in time at which an intermediate language file for an application is loaded, storing the changed optimization file, creating and storing verification information for verifying whether the intermediate language file is changed, determining whether the intermediate language file is changed based on the stored verification information in response to reloading of the intermediate language file, and creating a new optimization file by deleting the changed optimization file or recovering the original optimization file based on the changed optimization file and reusing the original optimization file, based on whether the intermediate language file is changed.

According to some example embodiments, it is possible to enhance a loading speed of an intermediate language file by simultaneously protecting and reusing an optimization file associated with the intermediate language file.

Further areas of applicability will become apparent from the description provided herein. The description and specific examples in this summary are intended for purposes of illustration only and are not intended to limit the scope of the present disclosure.

BRIEF DESCRIPTION OF THE FIGURES

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

Figure 1:
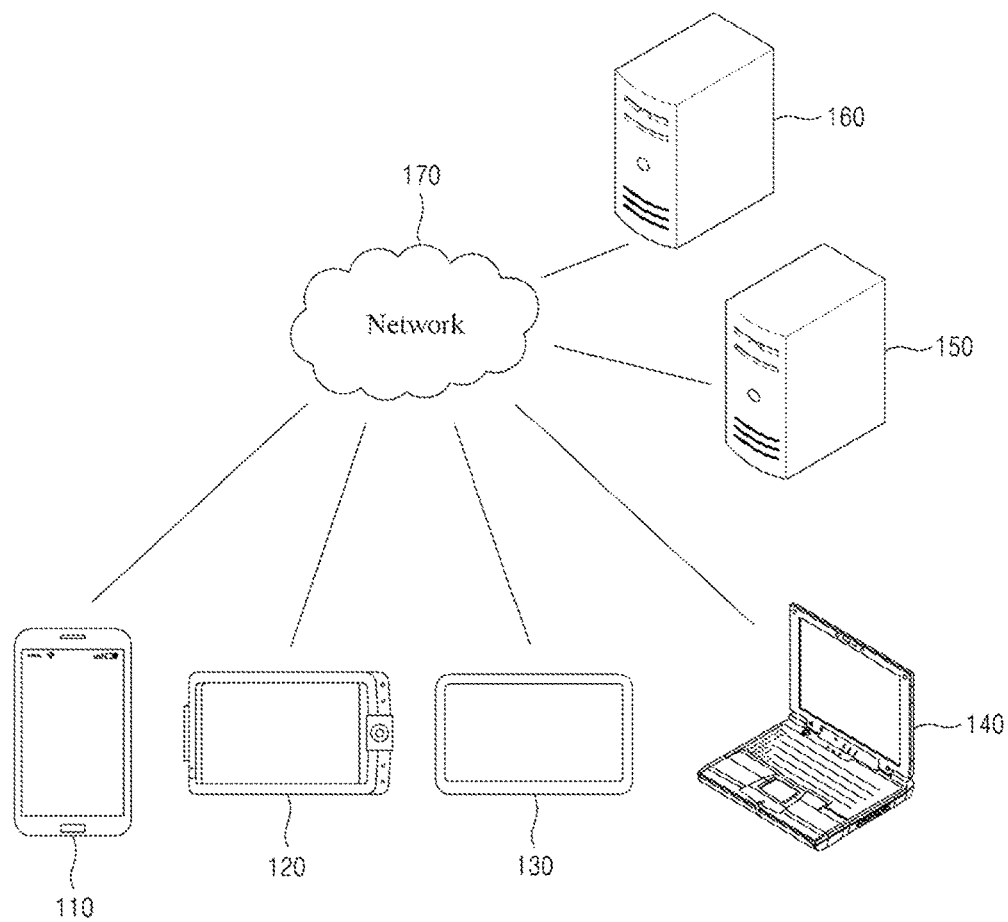
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be described as being implemented by one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, the number of electronic devices and/or the number of servers are not limited thereto.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, navigation, a computer, a laptop computer, a digital broadcasting terminal, a personal digital assistant (PDA), a portable multimedia player (PMP), tablet personal computer (PC), and the like. For example, the electronic device 110 may communicate with other electronic devices 120, 130, and/or 140, and/or the servers 150 and/or 160 over the network 170 in a wired communication manner or in a wireless communication manner.

The communication scheme is not particularly limited and may include a communication method that uses a near field communication between devices as well as a communication method using a communication network, for example, a mobile communication network, the wired Internet, the wireless Internet, and a broadcasting network, which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, the communications schemes described above are examples, and at least some example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and/or 140 over the network 170.

For example, the server 150 may expand a function, for example, an application addition function, of a package file by registering the package file of the application uploaded from the electronic device 120 over the network 170 and by adding a code for an additional function, such as a protection function, an encryption function, etc., to the registered package file. Here, the server 150 may provide the package file of which the function is expanded to the electronic device 110 directly or through a separate server, for example, the server 160. The electronic device 110 may install and execute the application on the electronic device through the package file of the application, and may use a preset service, for example, a game service, a chat service, a social network service (SNS), and the like, through the application.

Figure 2:
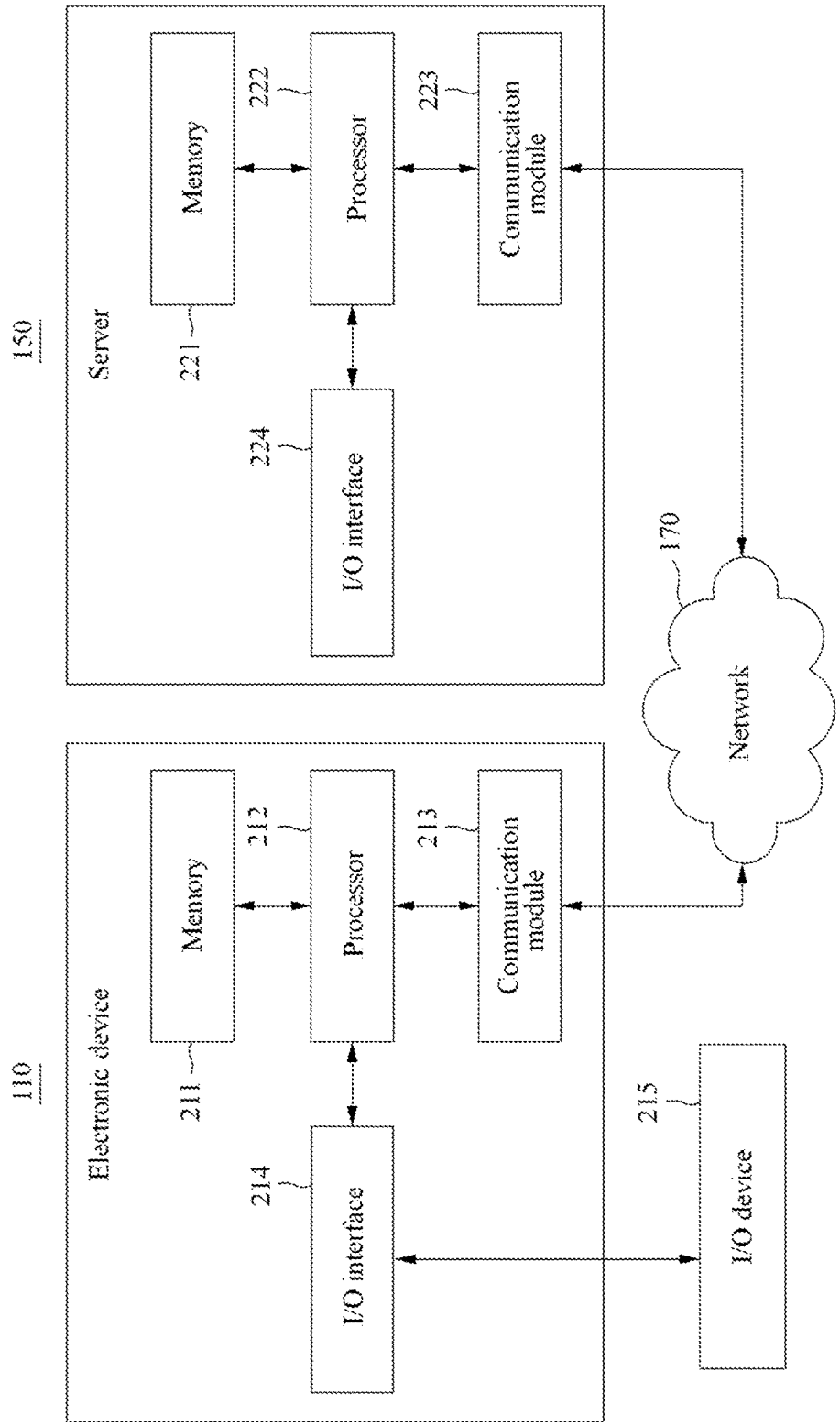
FIG. 2 is a block diagram illustrating an example of a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The same or similar constituent elements may be applicable to other electronic devices 120, 130, and/or 140, or the server 160, and also to still other electronic devices or still other servers.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), read only memory (ROM), a disk drive, etc., as a computer-readable storage medium. Also, an OS and at least one program code, for example, a code for an application for video call, a browser, etc., installed and executed on the electronic device 110, may be stored in the memory 211, 221. Such software constituent elements may be loaded from another computer-readable storage medium separate from the memory 211, 221 using a drive mechanism. The other computer-readable storage medium may include, for example, a floppy drive, a disk, a tape, a DVD/CD-ROM drive, a memory card, etc. According to other example embodiments, software constituent elements may be loaded to the memory 211, 221 through the communication module 213, 223, instead of, or in addition to, the computer-readable storage medium. For example, at least one program may be loaded to the memory 211, 221 based on a program, for example, the application, installed by files provided over the network 170 from developers or a file distribution system, for example, the server 160, which provides an installation file of the application.

The processor 212, 222 may be configured to process computer-readable instructions, for example, the aforementioned at least one program code, of a computer program by performing basic arithmetic operations, logic operations, and I/O operations. The computer-readable instructions may be provided from the memory 211, 221 and/or the communication module 213, 223 to the processor 212, 222. For example, the processor 212, 222 may be configured to execute received instructions in response to the program code stored in the storage device, such as the memory 211, 222. The processors 212 and 222 may each be hardware-implemented data processing devices having circuitry that is physically structured to execute desired operations including, for example, operations represented as code and/or instructions included in a program. Examples of the above-referenced hardware-implemented data processing devices include, but are not limited to, a microprocessor, a central processing unit (CPU), a processor core, a multi-core processor; a multiprocessor, an application-specific integrated circuit (ASIC), and a field programmable gate array (FPGA). Processors executing program code are programmed processors, and thus, are special-purpose computers.

The communication module 213, 223 may provide a function for communication between the electronic device 110 and the server 150 over the network 170, and may provide a function for communication with another electronic device, for example, the electronic device 120 or another server, for example, the server 160. For example, the processor 212 of the electronic device 110 may transfer a request, for example, a request for a video call service, created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 or the memory 211, and content, a file, etc., may be stored in a storage medium further includable in the electronic device 110.

The I/O interface 214, 224 may be a device used for interface with an I/O device 215. For example, an input device may include a keyboard, a mouse, etc., and an output device may include a device, such as a display for displaying a communication session of an application. As another example, the I/O interface 214 may be a device for interface with an apparatus in which an input function and an output function are integrated into a single function, such as a touch screen. In detail, when processing instructions of the computer program loaded to the memory 211, the processor 212 of the electronic device 110 may display a service screen configured using data provided from the server 150 or the electronic device 120, or may display content on a display through the I/O interface 214.

According to other example embodiments, the electronic device 110 and the server 150 may include a greater or lesser number of constituent elements than the number of constituent elements shown in FIG. 2. However, there is no need to clearly illustrate many constituent elements according to the related art. For example, the electronic device 110 may include at least a portion of the I/O device 215, or may further include other constituent elements, for example, a transceiver, a global positioning system (GPS) module, a camera, a variety of sensors, a database, and the like. In detail, if the electronic device 110 is a smartphone, the electronic device 110 may be configured to further include a variety of constituent elements, for example, an accelerometer sensor, a gyro sensor, a camera, various physical buttons, a button using a touch panel, an I/O port, a vibrator for vibration, etc., which are generally included in the smartphone.

A loading speed enhancement system according to example embodiments may be configured in an apparatus in which an application is executed. That is, a loading speed enhancement method according to the example embodiments may be executed at any type of devices in which the application is installed and executed. For clarity of description, hereinafter, example embodiments of performing the loading speed enhancement method through the loading speed enhancement system in which a package file for installing and executing the application on the electronic device 110 is stored on the electronic device 110 and configured in the electronic device 110 will be described.

Figure 3:
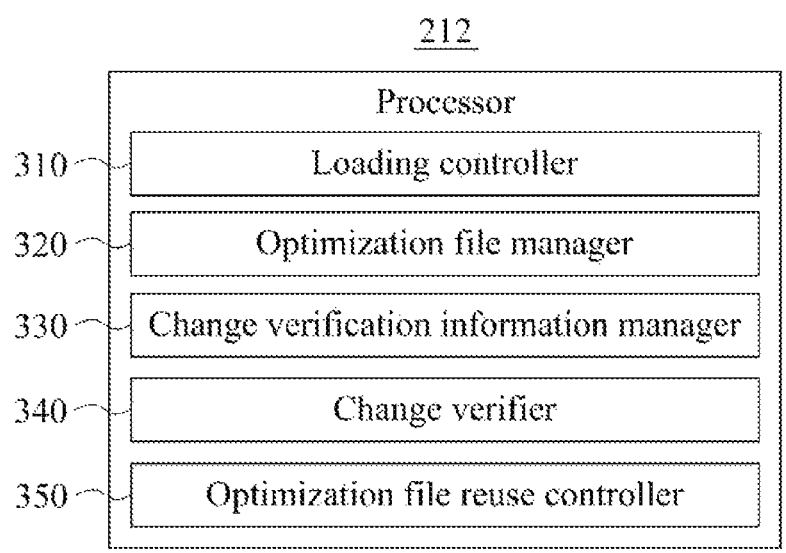
FIG. 3 is a block diagram illustrating an example of constituent elements includable in a processor of an electronic device according to at least one example embodiment.
Figure 4:
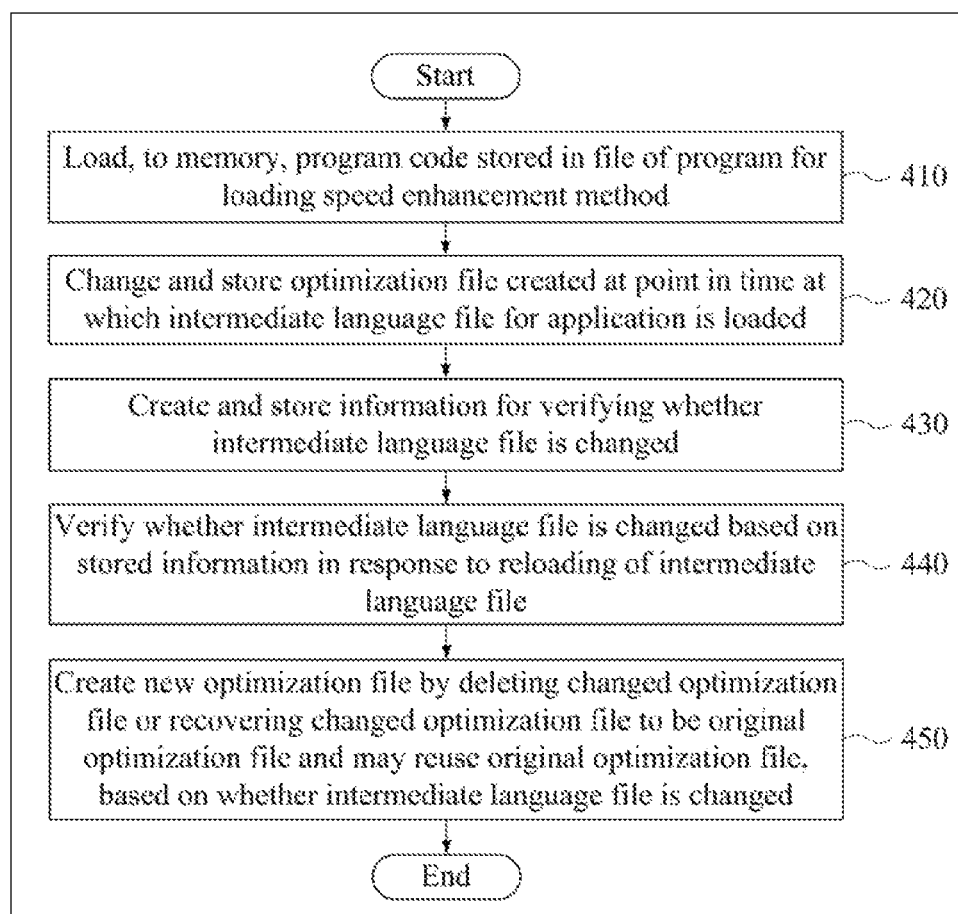
FIG. 4 is a flowchart illustrating an example of a method performed at an electronic device according to at least one example embodiment.

FIG. 3 is a diagram illustrating an example of constituent elements includable in a processor of an electronic device according to at least one example embodiment, and FIG. 4 is a flowchart illustrating an example of an optimal photographing position recommending method performed at an electronic device according to at least one example embodiment.

The electronic device 110 may configure the loading speed enhancement system. Referring to FIG. 3, the processor 212 of the electronic device 110 may include a loading controller 310, an optimization file manager 320, a change verification information manager 330, a change verifier 340, and an optimization file reuse controller 350. The processor 212 and the constituent elements of the processor 212 may control the electronic device 110 to perform operations 410 through 450 included in the loading speed enhancement method of FIG. 4. Here, the processor 212 and the constituent elements of the processor 212 may be configured to execute instructions according to a code of at least one program and a code of an OS included in the memory 211. Also, the constituent elements of the processor 212 may be representations of different functions performed at the processor 212 in response to a control command provided from the program code stored in the electronic device 110. For example, the processor 212 may use the loading controller 310 as a functional representation that operates to load a program code stored in a file of the program for the loading speed enhancement method in response to the control command.

In operation 410, the loading controller 310 may load, to the memory 211, a program code stored in a file of a program for the loading speed enhancement method. For example, according to at least some example embodiments, a package file of an application, such as an ANDROID application package (APK) file, may include the program code for the loading speed enhancement method. When the package file is first executed for installing the application in the electronic device 110, the program code stored in the package file may be loaded into the memory 211. In addition, whenever the application is executed, the program code may be loaded into the memory 211. The loading controller 310 may load the program code into the memory 211 under control of an OS.

Here, the program code loaded to the memory 211 may provide a control function for managing the program code for the application and an optimization file. An intermediate language file for the application may also be loaded in operation 410.

The optimization file manager 320, the change verification information manager 330, the change verifier 340, and the optimization file reuse controller 350 included in the processor 212 may be functional representations of the processor 212 to perform operations 420 through 450 by executing a command of a portion corresponding to the program code loaded to the memory 211. For example, according to at least some example embodiments, the processor 212 may implement any or all constituent elements of the processor 212 (e.g., the loading controller 310, optimization file manager 320, change verification information manager 330, change verifier 340 and/or optimization file reuse controller 350) by executing instructions (e.g., instructions included in the program code loaded into memory 211)

corresponding to any or all operations described herein as being performed by any or all constituent elements of the processor 212.

In operation 420, the optimization file manager 320 may change and store the optimization file created at a point in time at which the intermediate language file for the application is loaded. As described above, once the intermediate language file is loaded, the optimization file translated from the intermediate language file may be created and used. Here, the optimization file manager 320 may change and store the created optimization file. Change of the optimization file may be performed using at least one of methods capable of acquiring an original optimization file, such as a method of changing a name or a path of the optimization file, a method of encrypting the optimization file, and the like.

For example, the optimization file manager 320 may store at least one of the name and the path of the created optimization file and may change the optimization file by changing at least one of the name and the path of the optimization file. At least one of the stored name and path may be used to recover the changed optimization file.

As another example, the optimization file manager 320 may change the optimization file by encrypting the created optimization file. The encrypted optimization file may be recovered through decryption. An encryption method may also use one of any type of methods capable of acquiring the original optimization file. For example, a key used for encryption may be exclusively used and encryption and decryption may be performed using a new key for each individual instance of encryption and decryption. Regardless of a type of a key, such as a symmetric key, an asymmetric key, and the like, a selected type of a key may be used.

In operation 430, the change verification information manager 330 may create and store information for verifying whether the intermediate language file is changed. For example, an error detection code created through a cyclic redundancy check (CRC) for the intermediate language file may be created as information for verifying whether the intermediate language file is changed. Any type of methods capable of verifying whether the intermediate language file is changed may be applied without being limited.

If necessary, information for verifying whether an OS, for example, the OS of the electronic device 110 is changed and whether the application is changed may be further created and stored.

In operation 440, the change verifier 340 may verify whether the intermediate language file is changed based on the stored information in response to reloading of the intermediate language file. As used herein, an operation of verifying whether information has changed may refer to an operation of determining whether the information has changed. In the example of the CRC, the change verifier 340 may verify whether the intermediate language file is changed by comparing the error detection code created in response to the reloaded intermediate language file and the stored error detection code.

Also, the change verifier 340 may further verify whether the OS is changed or whether the application is changed. In this case, information that may be further stored in operation 430, for example, information for verifying whether the OS is changed or whether the application is changed, may be used to verify whether the OS is changed or whether the application is changed.

In operation 450, the optimization file reuse controller 350 may create a new optimization file by deleting the changed optimization file or recovering the changed optimization file to be an original optimization file and may reuse the original optimization file, based on whether the intermediate language file is changed. As used herein, the operation of recovering the changed optimization file to be an original optimization file refers to, for example, recovering the original optimization file based on the changed optimization file. For example, according to at least some example embodiments, the changed optimization file may be a changed version of the original optimization file, and the original optimization file may be recovered by reverting one or more of the changes that were made to create the changed optimization file from the original file. For example, the optimization file reuse controller 350 may recover and reuse the changed optimization file while the intermediate language file is not changed. Accordingly, a loading speed may be enhanced by minimizing duplicate creation of the optimization file.

If the intermediate language file is changed, for example, in the case of patch of the application, a previously created optimization file may not be used as is. Accordingly, the changed and thereby stored optimization file may be deleted and a new optimization file may be created and used through the reloaded intermediate language file. Here, by repeating operations 420 through 450 on the recreated new optimization file, the new optimization file may be reused to load the intermediate language file.

Also, although the OS or the application is changed, the optimization file reuse controller 350 may delete the changed and thereby stored optimization file and may create the new optimization file. That is, in response to at least one of the intermediate language file, the OS, and the application being changed, the optimization file reuse controller 350 may delete the changed optimization file and may create the new optimization file. In this case, the optimization file reuse controller 350 may recover and reuse the changed optimization file while no change is made to the intermediate language file, the OS, and the application. Accordingly, the loading speed may be enhanced by minimizing duplicate creation of the optimization file.

Figure 5:
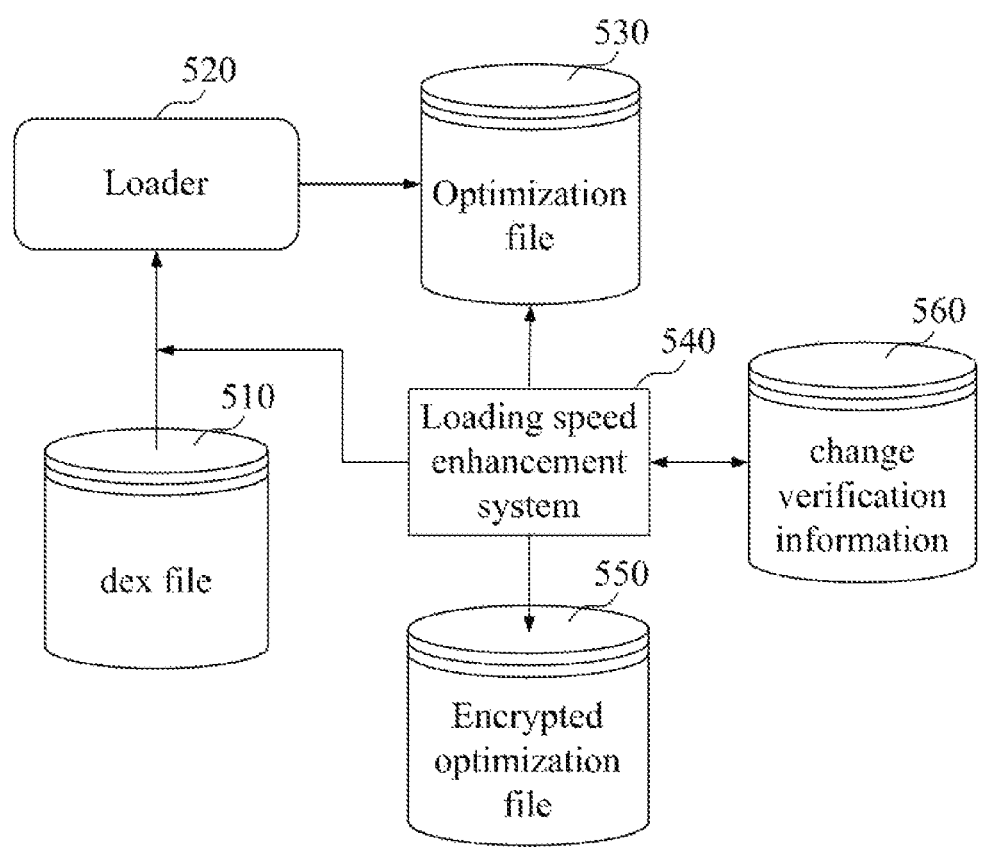
FIG. 5 illustrates an example of changing an optimization file according to at least one example embodiment.

FIG. 5 illustrates an example of changing an optimization file according to at least one example embodiment. In response to installation or execution of an application on the electronic device 110, a dex file 510 included in an ANDROID application package (APK) file of the application may be loaded by a loader 520. An optimization file 530 associated with the dex file 510 may be created.

Here, a loading speed enhancement system 540 configured in the electronic device 110 may change and store the created optimization file 530. FIG. 5 illustrates an example in which the loading speed enhancement system 540 encrypts and changes the optimization file 530 and stores an encrypted optimization file 550.

In this example, the loading speed enhancement system 540 may create and store change verification information 560. Here, the change verification information 560 may include information for verifying whether the dex file 510 is changed, and optionally, may further include information for verifying whether an ANDROID OS is changed and/or information for verifying whether the application is changed.

Figure 6:
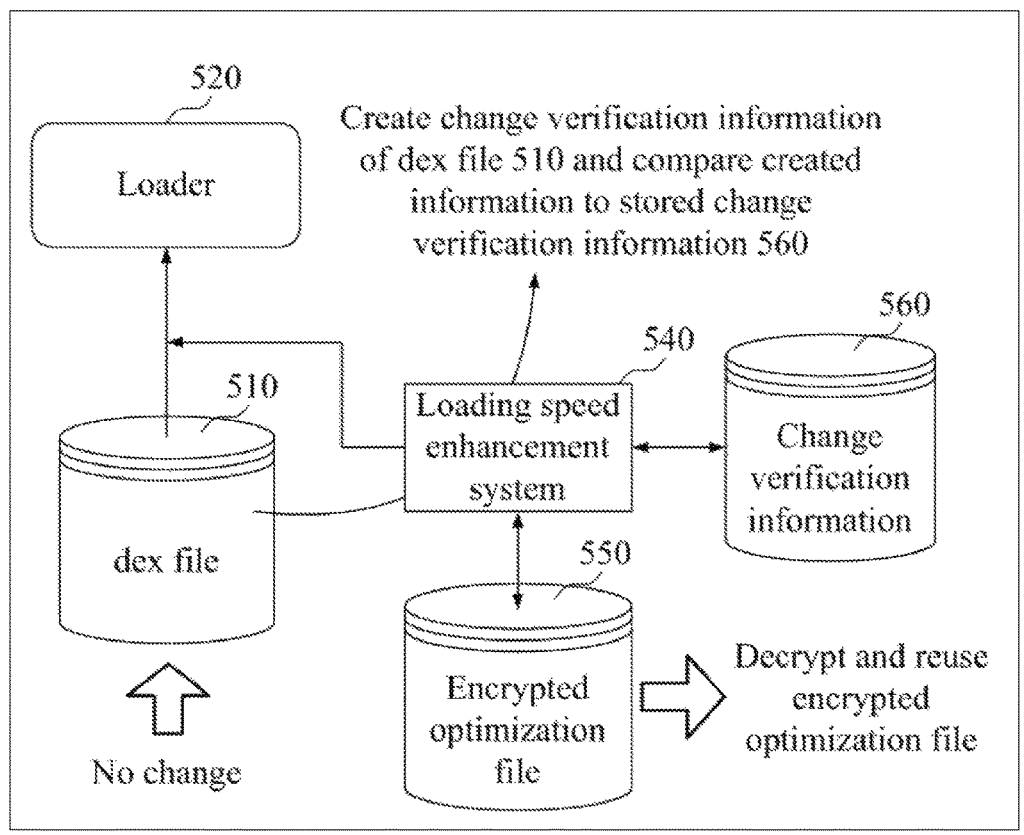
FIG. 6 illustrates an example of recovering a changed optimization file in response to a dex file not being changed according to at least one example embodiment.

FIG. 6 illustrates an example of recovering a changed optimization file in response to a dex file not being changed according to at least one example embodiment. FIG. 6 illustrates an example of reloading the dex file 510 not changed through the loader 520. The loading speed enhancement system 540 may verify whether the dex file 510 is changed by creating information for verifying whether the reloaded dex file 510 is changed and by comparing the created information to the stored change verification information 560. In the example of FIG. 6, since the dex file 510 is not changed, the loading speed enhancement system 540 may acquire an original optimization file, for example, the optimization file 530 of FIG. 5, by decrypting the encrypted optimization file 550, and may reuse the decrypted optimization file.

Figure 7:
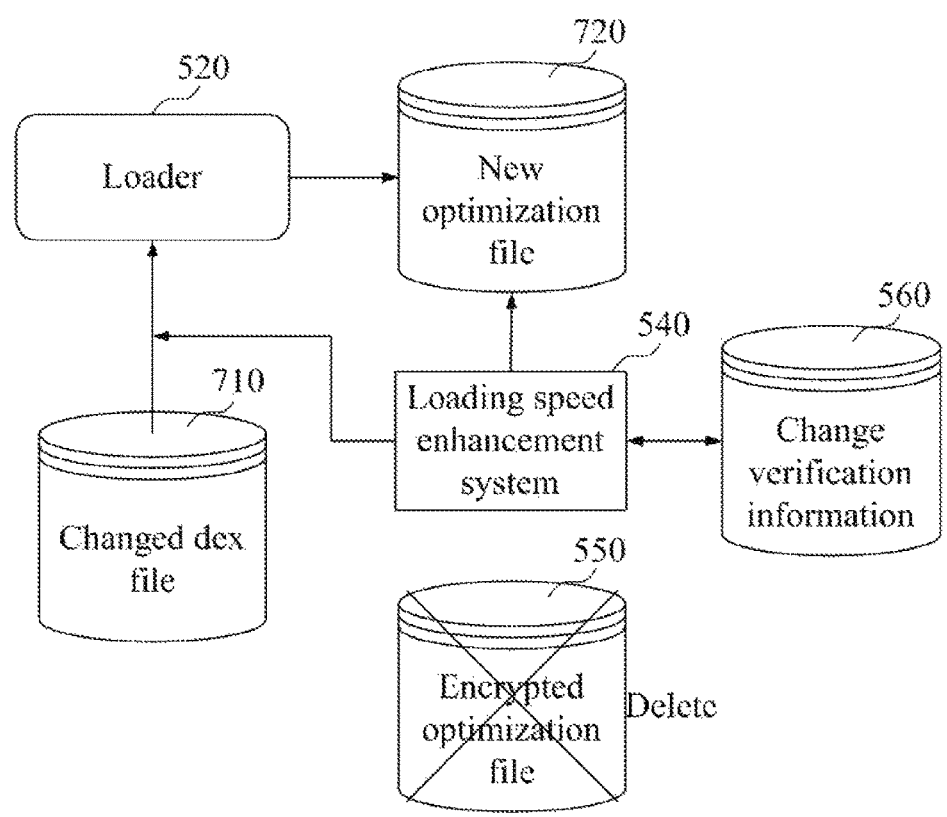
FIG. 7 illustrates an example of creating a new optimization file according to a dex file being changed according to at least one example embodiment.

FIG. 7 illustrates an example of creating a new optimization file according to a dex file being changed according to at least one example embodiment. FIG. 7 illustrates an example of loading a changed dex file 710 through the loader 520. The loading speed enhancement system 540 may verify whether the dex file 510 is changed by creating change verification information of the loaded changed dex file 710 and by comparing the created change verification information to the stored change verification information 560. In the example of FIG. 7, since the changed dex file 710 is loaded, the loading speed enhancement system 540 may delete the encrypted optimization file 550 and may create a new optimization file 720.

The new optimization file 720 may be changed, for example, encrypted and thereby stored and change verification information associated with the changed dex file 710 may also be newly stored.

According to some example embodiments, it is possible to enhance a loading speed of an intermediate language file by simultaneously protecting and reusing an optimization file associated with the intermediate language file.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM, random access memory (RAM, flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A non-transitory computer-readable medium storing computer-executable instructions that, when executed by a computer, cause the computer to perform operations including:
   generating a changed optimization file by changing an original optimization file, the original optimization file being an optimization file created at a point in time at which an intermediate language file for an application is loaded;
   storing the changed optimization file;
   creating and storing verification information for verifying whether the intermediate language file is changed;
   determining whether the intermediate language file is changed based on the stored verification information in response to reloading of the intermediate language file; and
   creating a new optimization file by deleting the changed optimization file or recovering the original optimization file based on the changed optimization file and reusing the original optimization file, based on whether the intermediate language file is changed.

2. The non-transitory computer-readable medium of claim 1, wherein the generating includes,
   storing at least one of a name and a path of the original optimization file, and creating the changed optimization file by changing information about at least one of the name and the path of the original optimization file, and
   wherein the recovering includes,
   recovering the original optimization file by recovering information in which at least one of the name and the path is changed.

3. The non-transitory computer-readable medium of claim 1,
   wherein the generating includes generating the changed optimization file by encrypting the original optimization file, and wherein the recovering includes recovering the original optimization file by decrypting the encrypted optimization file.

4. The non-transitory computer-readable medium of claim 1,
wherein the creating and storing verification information includes further creating and storing at least one piece of information for determining whether an operating system (OS) of a computer is changed and information for determining whether the application is changed, and
wherein the determining whether the intermediate language file is changed includes further determining whether the OS is changed or whether the application is changed by further using the stored at least one piece of information.

5. The non-transitory computer-readable medium of claim 4, wherein the recovering includes creating the new optimization file by deleting the changed optimization file in response to at least one of the intermediate language file, the OS, and the application being changed.

6. The non-transitory computer-readable medium of claim 1, wherein the creating and storing verification information includes creating and storing an error detection code through a cyclic redundancy check (CRC) for the intermediate language file, and
the determining whether the intermediate language file is changed includes,
creating an error detection code based on the reloaded intermediate language, and
determining whether the intermediate language file is changed based on the error detection code created for the reloaded intermediate language file and the stored error detection code.

7. A loading speed enhancement method executed at a computer, the method comprising:
generating a changed optimization file by changing an original optimization file, the original optimization file being an optimization file created at a point in time at which an intermediate language file for an application is loaded;
storing the changed optimization file;
creating and storing verification information for determining whether the intermediate language file is changed;
determining whether the intermediate language file is changed based on the stored verification information in response to reloading of the intermediate language file; and
creating a new optimization file by deleting the changed optimization file or recovering the original optimization file based on the changed optimization file and reusing the original optimization file, based on whether the intermediate language file is changed.

8. The method of claim 7,
wherein the generating includes storing at least one of a name and a path of the original optimization file, and creating the changed optimization file by changing information about at least one of the name and the path of the original optimization file, and wherein the recovering includes recovering the original optimization file by recovering information in which at least one of the name and the path is changed.

9. The method of claim 7,
wherein the generating includes generating the changed optimization file by encrypting the original optimization file, and
wherein the recovering includes recovering the original optimization file by decrypting the encrypted optimization file.

10. The method of claim 7,
wherein the creating and storing verification information includes further creating and storing at least one piece of information for determining whether an operating system (OS) of a computer is changed and information for determining whether the application is changed, and
wherein the determining whether the intermediate language file is changed includes further determining whether the OS is changed or whether the application is changed by further using the stored at least one piece of information.

11. The method of claim 10, wherein the recovering includes creating the new optimization file by deleting the changed optimization file in response to at least one of the intermediate language file, the OS, and the application being changed.

12. A loading speed enhancement system comprising:
a memory storing computer-executable instructions; and
one or more processors configured to execute computer-readable instructions such that the one or more processors are configured to,
generate a changed optimization file by changing an original optimization file, the original optimization file being an optimization file created at a point in time at which an intermediate language file for an application is loaded,
store the changed optimization file,
create and store verification information for verifying whether the intermediate language file is changed,
determine whether the intermediate language file is changed based on the stored verification information in response to reloading of the intermediate language file, and
crate a new optimization file by deleting the changed optimization file or recovering the original optimization file based on the changed optimization file and reuse the original optimization file, based on whether the intermediate language file is changed.

13. The system of claim 12, wherein the one or more processors are configured to execute computer-readable instructions such that the one or more processors are further configured to,
store at least one of a name and a path of the original optimization file, and create the changed optimization file by changing information about at least one of the name and the path of the original optimization file, and
recover the original optimization file by recovering information in which at least one of the name and the path is changed.

14. The system of claim 12, wherein the one or more processors are configured to execute computer-readable instructions such that,
the generating includes generating the changed optimization file by encrypting the original optimization file, and
the recovering includes recovering the original optimization file by decrypting the encrypted optimization file.

15. The system of claim 12, wherein the one or more processors are configured to execute computer-readable instructions such that,
the creating and storing verification information includes further creating and storing at least one piece of information for determining whether an operating system (OS) of a computer is changed and information for determining whether the application is changed, and the determining whether the intermediate language file is changed includes further determining whether the OS is changed or whether the application is changed by further using the stored at least one piece of information.

16. The system of claim 15, wherein the one or more processors are configured to execute computer-readable instructions such that the recovering includes creating the new optimization file by deleting the changed optimization file in response to at least one of the intermediate language file, the OS, and the application being changed.

* * * * *